April 21, 1970   J. D. WALLACE   3,507,535
CAMPING TRAILER LIFT MECHANISM
Filed Jan. 10, 1968   4 Sheets-Sheet 1

INVENTOR:
JOSEPH D. WALLACE
BY
Dawson, Tilton, Fallon & Lungmus
ATT'YS

INVENTOR:
JOSEPH D. WALLACE
BY
Dawson, Tilton, Fallon & Lungmus
ATT'YS

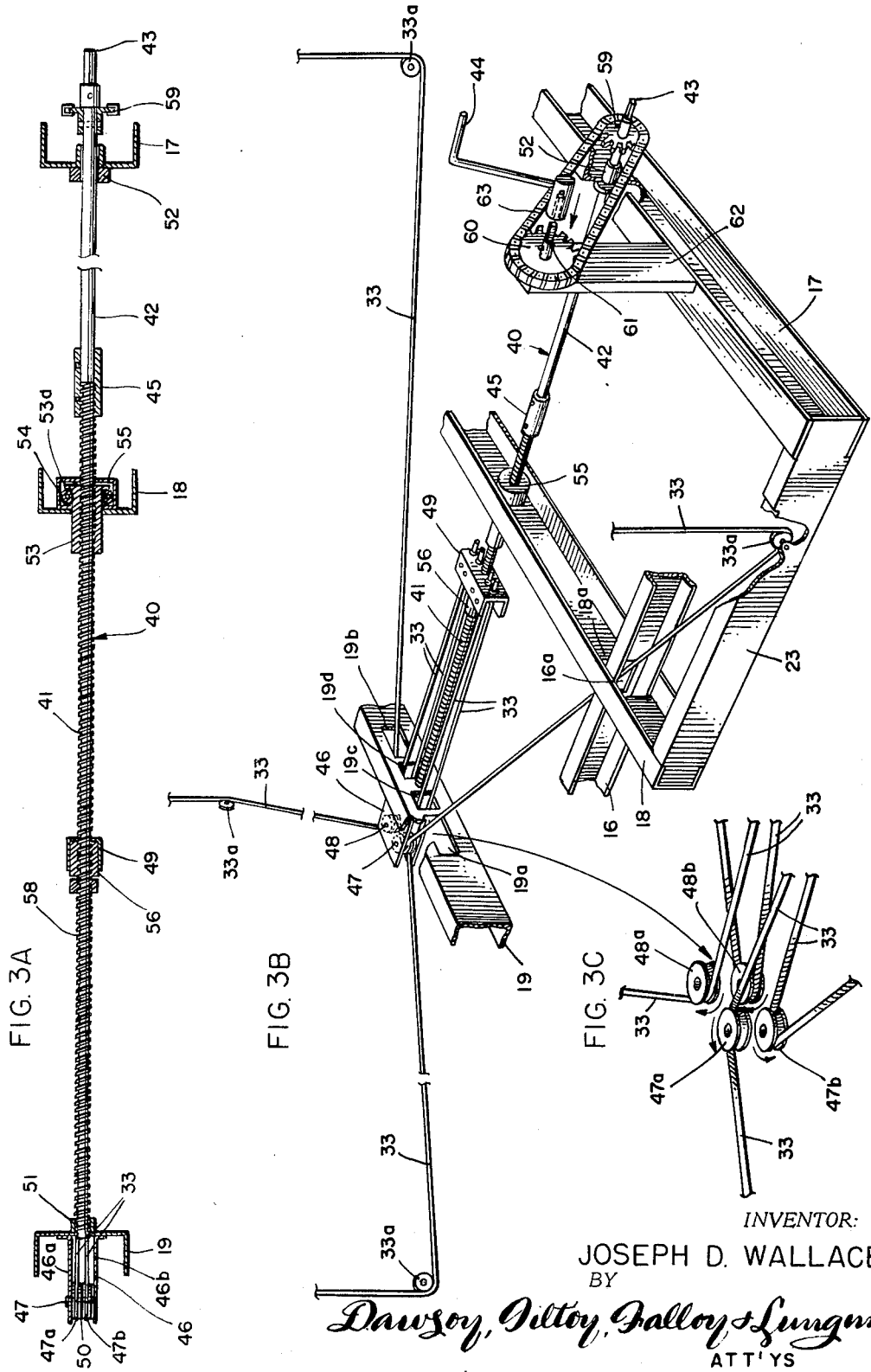

April 21, 1970     J. D. WALLACE     3,507,535
CAMPING TRAILER LIFT MECHANISM
Filed Jan. 10, 1968     4 Sheets-Sheet 4
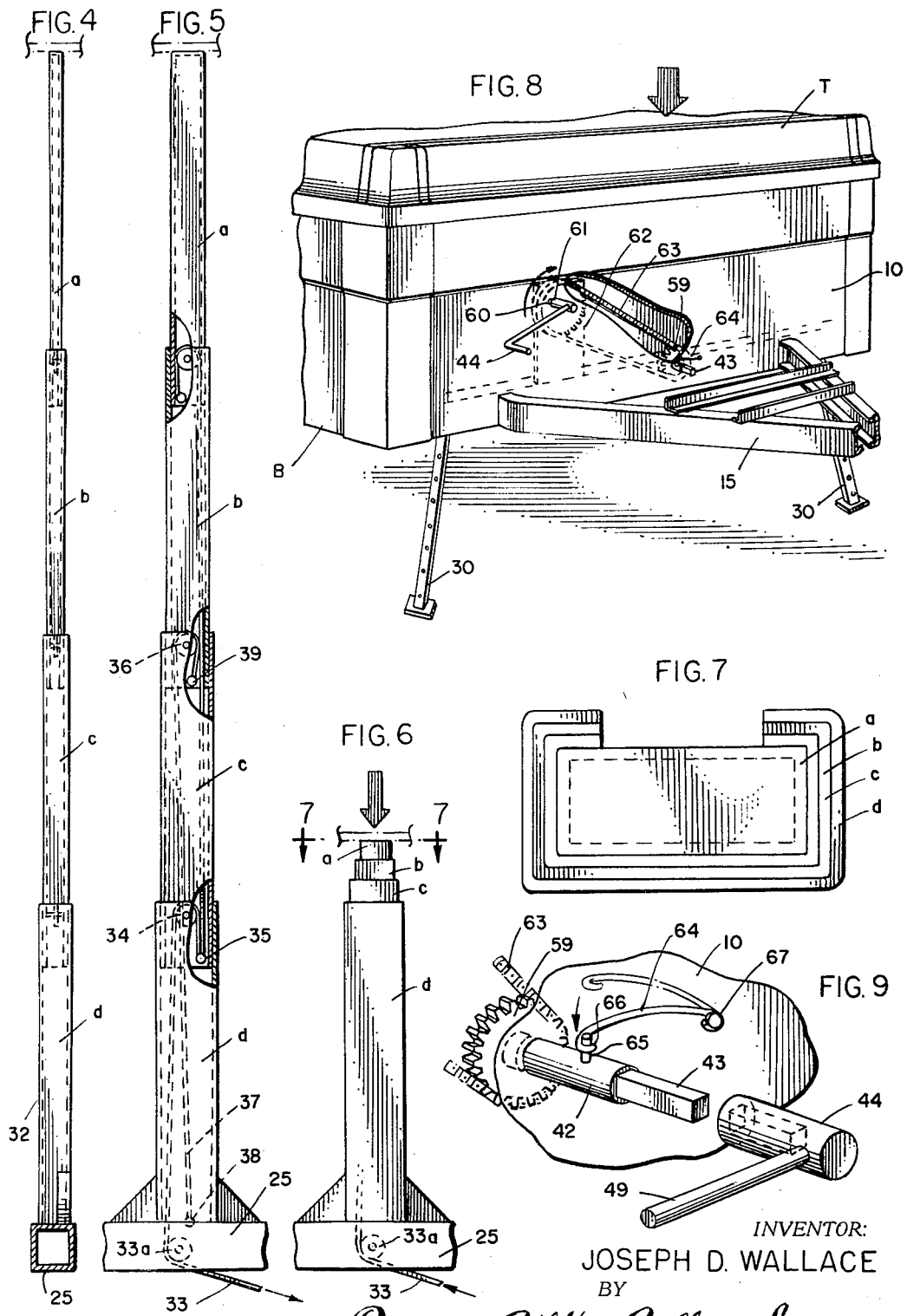
INVENTOR:
JOSEPH D. WALLACE
BY
Dawson, Tilton, Fallon & Lungmus
ATT'YS

United States Patent Office 3,507,535
Patented Apr. 21, 1970

3,507,535
CAMPING TRAILER LIFT MECHANISM
Joseph D. Wallace, Wichita, Kans., assignor to The Coleman Company, Inc., Wichita, Kans., a corporation of Kansas
Filed Jan. 10, 1968, Ser. No. 696,941
Int. Cl. B60p 3/34
U.S. Cl. 296—23                                14 Claims

ABSTRACT OF THE DISCLOSURE

A mechanism for use in combination with a camping trailer to raise and lower the top. The top, which forms a cover for the body in its lowered position, is mounted on cable-operated telescopic corner posts, and the operating cables extend inwardly from the lower post sections for connection to the draw means of an operating mechanism. The draw means is actuated by a screw shaft which extends to one of the side panels of the body. A sprocket of relatively small size is mounted on the outer end of the screw shaft for driving the shaft, and a larger sprocket is mounted on a stub shaft, the outer end of which is accessible from outside the body. The sprockets are connected by a drive chain so that when the stub shaft is rotated by means of a hand crank the screw shaft will rotate at a greater speed than the stub shaft, thereby accomplishing a more rapid raising and lowering of the top. Preferably, the outer end of the screw shaft is also accessible from outside of the trailer and is adapted to receive a manual crank, thereby facilitating the raising and lowering of the top by women and children at a reduced speed and with reduced torque. A manual latch can be provided for cooperating with either of the protruding shaft ends for preventing rotation of the screw shaft when the top is in raised position.

BACKGROUND

Camping trailers which travel in a collapsed, compact condition, and are opened at the campsite by raising the roof, and extending outwardly the ends or the sides, have become increasingly popular in the United States in recent years, and are now in widespread use. As the size of these camping units has increased, and particularly where the size and weight of the top or roof has increased to the point where it is difficult for one person to raise the roof from travel position to camping position, there has been an increased need for mechanical lift mechanisms, which will raise and lower the top in a positive manner with a minimum of time and effort. Since such camping trailers ordinarily have a perimetric body (rectangular or square) with corner posts for supporting the top, cable-operated telescopic posts provide a convenient device for raising and lowering the tops. The construction and operation of such telescopic posts is well known, as shown by Davis Patent No. 133,017 and Newman Patent No. 459,613. Bontrager Patent No. 3,314,715 describes the use of such cable-operated telescopic posts for raising and lowering the roof of a trailer. However, certain problems have developed in the commercial use of such devices with camping trailers.

Since it is desirable to have the top or roof of the camping trailer raise and lower positively and uniformly, the operating cables from each corner post have been brought together and attached to a single main cable, which is tensioned by winding or unwinding it on a reel or winch mounted in front of the trailer body, for example, on the draw bars or tongue. The combination cable system of main cable and side cables has not proven as smooth and uniform in operation as would be desirable, the cable sections tending to stretch non-uniformly, causing canting of the top as it is raised and lowered, and/or raising of the top to less than its full height, as permitted by the maximum extension of the post sections.

Other problems relate to the safety of operation, and to the ease and speed of operation. The exposed section of the main cable and the winch on which it is wrapped can be somewhat hazardous in operation, especially for women and children. It would be desirable to provide an operating mechanism which is wholly contained within the body, and which provides a safer, smoother, and more uniform actuation.

Where the corner post cables are pulled by a single main cable, the rate and torque required for raising and lowering is determined by the size of the drum, or the gearing of the winch. This may be adapted for convenience of operation by a man of ordinary strength, but too much force or torque may be required for easy operation by a child or woman. It would therefore be desirable to provide an operating mechanism which can be easily operated by a child or woman, while at the same time permitting the roof to be raised and lowered in a minimum of time by a man of average strength.

SUMMARY

The foregoing problems have been solved by the development of an operating mechanism for camping trailers equipped with telescopic corner posts. The mechanism includes a screw shaft on which rides a draw means. The cables from the corner posts are connected to the draw means, and are tensioned as the drawplate or similar anchor device is moved along the screw shaft by rotation of the shaft. This provides for very smooth uniform operation of the cables and corner posts. The main shaft extends to a point adjacent a side panel, such as the front panel of the body, and preferably terminates in an end accessible from outside of the body, which is adapted to receive a manual crank for direct rotation of the shaft. In a preferred embodiment, a sprocket wheel is mounted on the shaft extension adjacent the panel wall for indirect driving of the shaft through a chain, which in turn is driven by a larger sized sprocket mounted on a stub shaft adjacent the same panel. Preferably, the stub shaft provides an extension through the wall of the panel, or is otherwise accessible from outside of the trailer, and is adapted to receive a manual crank for rotation of the stub shaft, the large sprocket thereon, thereby driving the smaller sprocket on the screw shaft. With this construction, the rotation of the stub shaft will require greater force or torque than the direct rotation of the main shaft, but the top can be raised and lowered at an accelerated rate. For normal operation by a man of ordinary strength, the maximum speed is desirable, and therefore the operating crank would be applied to the stub shaft. For operation by women or children, the operating crank can be applied directly to the screw shaft, the raising and lowering being at a reduced speed but also requiring less torque. This operating mechanism can be entirely enclosed within the body, except for the projecting ends of the stub shaft and screw shaft, and the crank can be removable for storage. Preferably, a manual latch is provided for cooperation with one or both of the shaft extensions to restrain rotation of the main shaft when the top is fully elevated.

DRAWINGS

The lift mechanism of this invention, including the novel operating mechanism, is illustrated in a preferred embodiment in the accompanying drawings, in which—

FIG 3A is a fragmentary sectional view of the operating mechanism taken on line 3A—3A of FIG. 3;

FIG. 3B is a fragmentary perspective view of the operating mechanism;

FIG. 3C is an enlarged fragmentary partially exploded perspective view of FIG. 3B showing the operating cables and cable rollers;

FIG. 4 is a fragmentary side elevational view of one of the corner posts in fully extended condition, as indicated at 4—4 in FIG. 2;

FIG. 5 is an elevational view of the same post, as seen from the inside of the trailer;

FIG. 6 is an elevational view similar to FIG. 5 showing the post in its lowered position;

FIG. 7 is a fragmentary elevational view of the same post taken on line 7—7 of FIG. 6;

FIG. 8 is a fragmentary perspective view of the front of the trailer, a portion of the body being broken away to more clearly illustrate the chain and sprockets of the operating mechanism; and FIG. 9 is an enlarged detailed view of a portion of the operating mechanism of FIG. 8.

DETAILED DISCLOSURE

Figure 1:
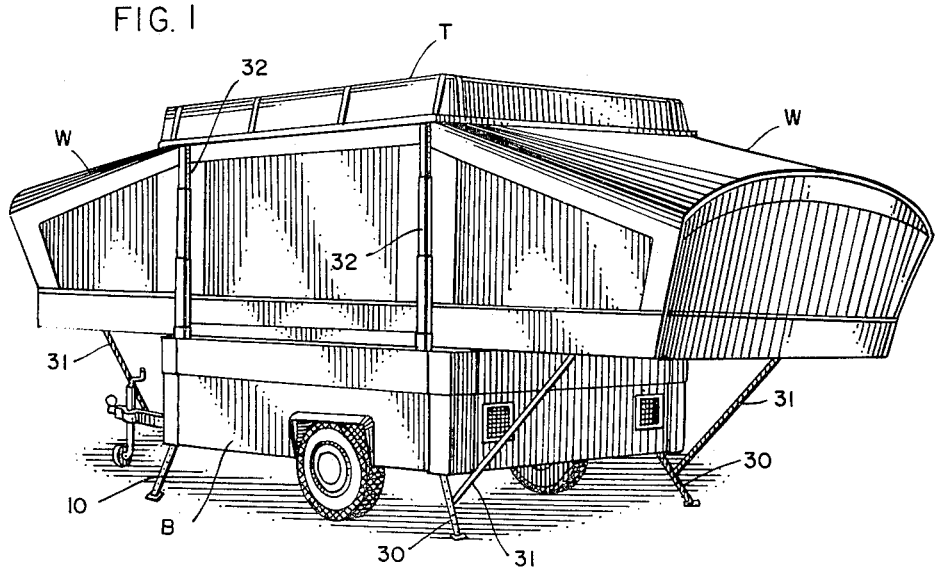
FIG. 1 is a perspective view of the kind of camping trailer to which the invention is applicable.

As shown in FIG. 1, the camping trailer includes a body B, extendible bed wings W and a top T. The trailer is illustrated in its expanded camping condition. For collapsing the trailer to travel condition, as is well known in the art, the bed wings W retract by sliding in over the body B, and the top T is lowered until it covers the body B. The trailer is then in travel condition.

Figure 2:
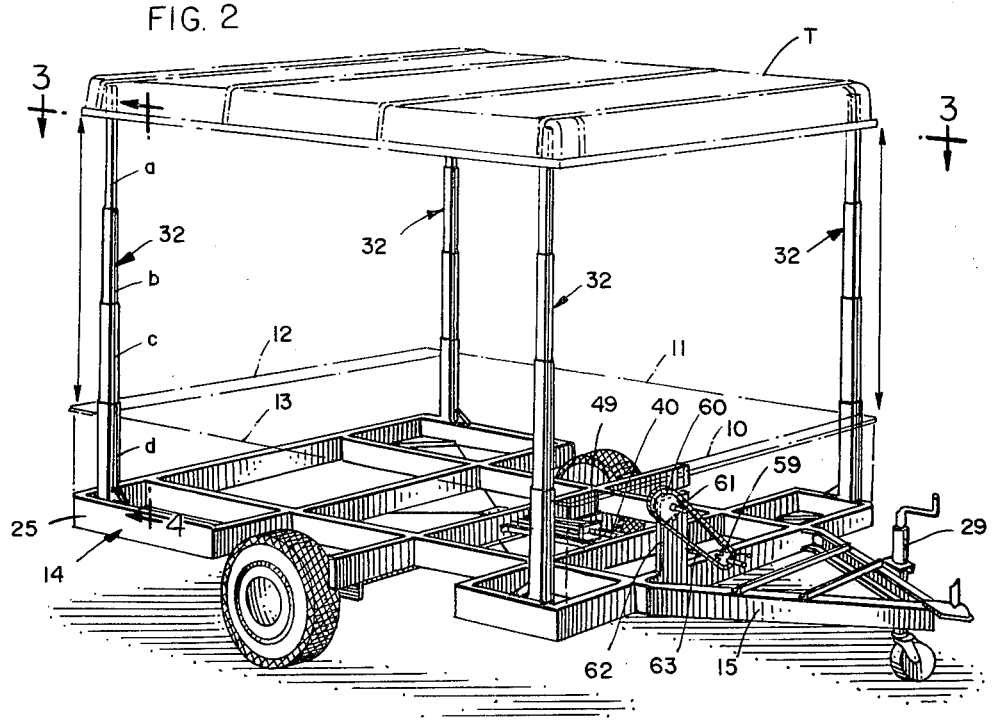
FIG. 2 is a perspective view of the camping trailer with the side coverings removed, illustrating the relation of the essential structural elements, the body side panels being indicated in dotted line.
Figure 3:
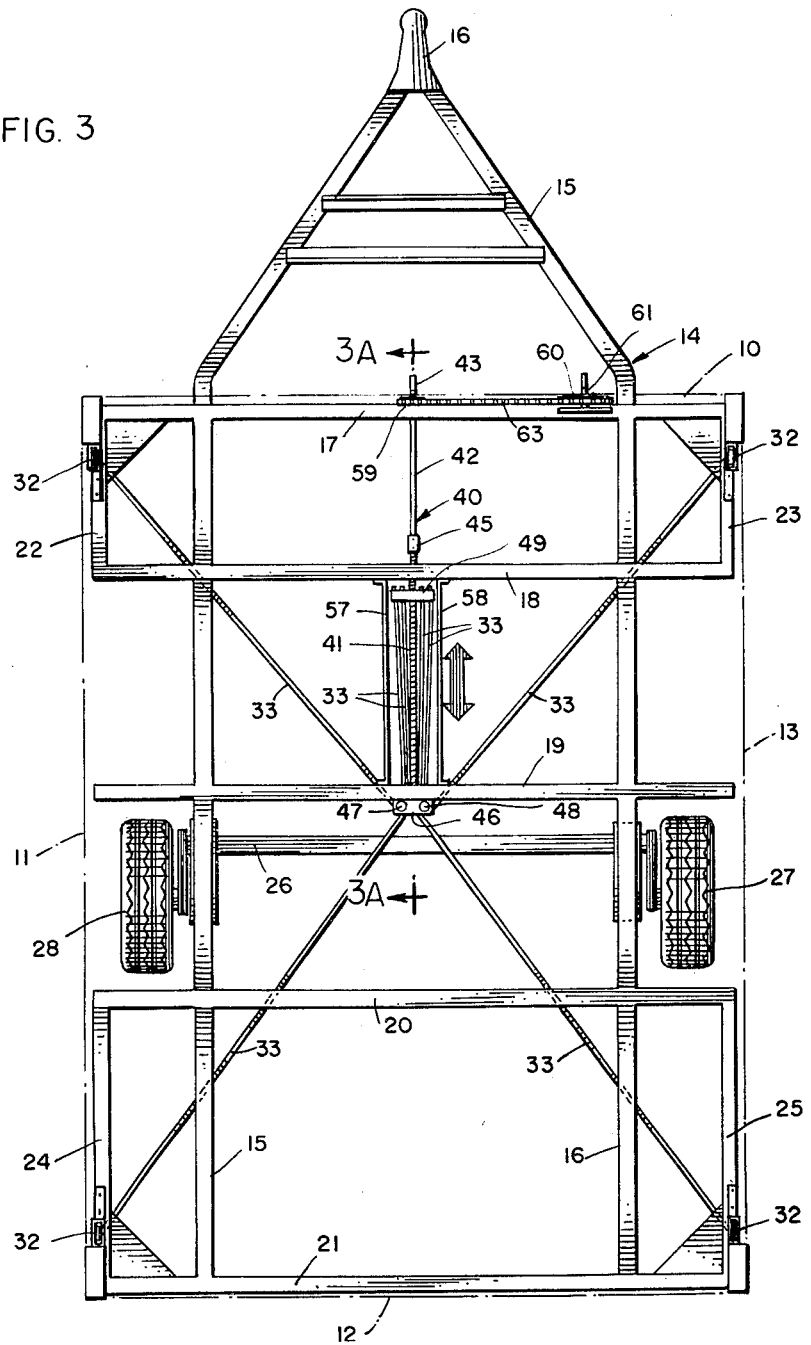
FIG. 3 is a top plan view, partly in section, taken on line 3—3 of FIG. 2.

The essential structural elements of the trailer are shown more clearly in FIG. 2. The side panels 10, 11, 12 and 13 are shown in dotted lines. It will be understood that these panels provide the sidewalls for the perimetric body case B, extending between the corners thereof. The side panels can be mounted on a supporting frame designated generally by the number 14, which extends beneath the body case adjacent its underside. The frame 14 is also shown in FIG. 3. In the illustration given, it includes longitudinally extending beams 15 and 16, which extend through the front wall 10 and are brought together to form a tongue 15 which terminates in a vehicle attachment hitch 16. The frame also includes crossbars 17, 18, 19, 20 and 21. In the illustration given, the outer ends of crossbars 17 and 18 are respectively connected by the support braces 22 and 23, while the outer ends of crossbars 20 and 21 are connected by support braces 24 and 25. The frame members may be formed of suitable steel or aluminum extrusions, such as I-beams, channels, hollow section bars, etc.

The frame 14 is provided with a wheel-equipped undercarriage, which may include the axle 26 and wheels 27 and 28.

Other support means can be provided for use with the trailer in a parked location at a campsite. As shown in FIGS. 1 and 2, these can include a retractable wheel support 29 at the forward end portion of tongue 15, and adjustable jack supports 30 located beneath the corners of the body B (FIG. 1). Auxiliary braces or supports for the bed wings W can be provided as indicated at 31 in FIG. 1.

The lift mechanism of the present invention includes cable-operated telescopic post means, which are designated generally by the number 32, one of the posts being located adjacent each corner of the trailer, as shown more clearly in FIGS. 2 and 3. As is well known in the art, the post means 32 provide a plurality of extendible and retractable telescopic sections for selectively increasing and decreasing the overall height thereof from the top of the upper post sections to the bottom of the lower post sections. The construction and operation of such telescopic posts are fully described in Patents Nos. 133,017, 459,613 and 3,314,715. In addition to the plurality of telescoping sections, they provide cable and pulley operating means including a main operating cable for each of the posts. As shown in FIG. 3, the bottom sections of the posts are respectively mounted on the brace supports 22–25, and the main operating cables 33 for each post extend inwardly from the lower sections of the posts to a central point beneath the body B. As shown in FIG. 2, the top or cover T is mounted on the tops of the upper post sections.

In the construction shown, four post sections $a$, $b$, $c$ and $d$ are provided. In general, at least two sections will be used, but usually it will not be desirable to employ more than five sections. Looking now at FIGS. 4 to 7, the details of the post sections and operating cables are shown to be similar to those described in the above-cited patents. By tensioning the main operating cable 33, as indicated in FIG. 5, the cable is pulled over roller 33a mounted on brace 25 and passes upwardly over roller 34 which is mounted on the upper end of lower post section $d$, and the cable extends downwardly to an anchor 35 attached to the lower end of the next post section $c$. Consequently, the lower end of post section $c$ is lifted up to approximately the level of the pulley or roller 34.

Similarly, a pulley or roller 36 is mounted on the upper end of section $c$ with a cable 37 extending thereover from an anchor 38 attached to the bottom of section $d$ with its upper end attached to an anchor 39 on the bottom of section $b$. Consequently, the elevation of the top of section $c$ with roller 34 attached thereto automatically causes the elevation of the bottom of section $b$ through the cable 37 attached to the bottom thereof at the anchor 39. This same type of cable and pulley operation can be extended to the successive upward sections, such as the sections $a$ and $b$, as indicated in FIG. 5, and is well known in the art. The posts may thereby be fully extended by the tensioning of cable 33 to the condition illustrated in FIGS. 4 and 5, or when the tension is released, the sections can be returned to a collapsed, telescoping condition, as illustrated in FIG. 6. Since the construction and operation of such post sections is well known in the art, it is not believed it will be necessary to further describe them herein.

Turning now to the distinctive features of the present invention, there is provided an operating mechanism for use in combination with the camping trailer equipped with the cable-operated telescoping corner posts. As shown more clearly in FIGS. 2, 3 and 3A, the operating mechanism includes a screw shaft designated generally by the number 40. The shaft 40 is rotatably mounted on frame 14, for example on crossbars 17, 18 or 19, in suitable bearings for axial rotation while remaining fixed longitudinally with respect to the frame. Shaft 40 preferably includes a threaded driven portion 41 which extends beneath the body, as shown, and a driving portion 42, which need not be threaded, which extends to a position adjacent one of the side panels, such as the front panel 10. Preferably, the outer end of shaft driving portion 42 extends through panel 10, or is otherwise accessible from outside of the body B. In the illustration given, the driving portion terminates in an end 43, which is adapted to receive a crank, such as the hand crank 44 illustrated in FIG. 9. The protruding shaft end 43 can be squared, as shown, or otherwise adapted to cooperate with a similarly shaped socket within the connector of the wrench. If desired, shaft sections 41 and 42 can be formed separately and detachably united by a suitable coupling 45, as indicated in FIG. 3A.

A roller support bracket 46 comprising spaced-apart upper and lower plates 46a and 46b, respectively, can be mounted centrally on cross bar 19 for supporting roller-equipped pins 47 and 48. Each pin 47 and 48 rotatably carries a pair of superimposed rollers for respectively receiving one of the cables 33 and guiding them into generally parallel alignment for attachment to draw bar 49. Pin 47 carries rollers 47a and 47b while pin 48 carries rollers 48a and 48b, and each pair of rollers may be separated by a bearing 50 (FIG. 3A) of nylon or other suitable material.

The cables pass around the rollers 33a provided at the bottom of each post 32 and pass through suitable openings provided in the frame members to the rollers 47a, 47b, 48a, and 48b. For example, referring to FIGS. 3 and 3B the cable 33 which is received by the roller 33a mounted on the support brace 32 passes through openings 16a and 18a provided in the frame members 16 and 18, respectively, adjacent the intersection thereof and then passes through opening 19a in cross bar 19 and around roller 47a. A second opening 19b is provided in cross bar 19 for the cable 33 extending from support brace 32. The cables which are received by rollers 47a and 47b pass through opening 19c in cross bar 19 and the cables received by rollers 48a and 48b pass through opening 19d in cross bar 19. The ends of the cables can be secured to draw bar 49 by means permitting the cables to be individually adjusted, if required. In one embodiment of the invention the cables were attached to eye hooks which were threadedly engaged with cross bar 49. However, the present system minimizes the required adjustment of the post cables 33 after initial installation.

Referring to FIG. 3A, one end of the screw shaft 40 is journaled in bushing 51 attached to cross bar 19. The threaded shaft 40 is rotatably supported adjacent its other end by bushing 52 which is mounted in cross bar 17. The screw shaft 40 passes through cross bar 18 and is rotatably supported therein by thrust nut 53 and bearings 54. Thrust nut 53 may be threaded onto the threaded portion 41 of the screw shaft until it is properly positioned and then fixed in place by means of a retaining pin or the like. Bearings 54 are held in place by radially enlarged shoulder 53a provided at one end of the thrust bearing and by retaining cup 55 attached to cross bar 18.

Cylindrical sleeve 56 is attached to draw bar 49 and is provided with a threaded bore for cooperation with the threads on shaft driven portion 41, the draw means 49 moving along the length of the threaded portion 41 as the shaft is rotated. Any tendency of the draw bar 49 to rotate with the shaft is prevented by the guide channels 57 and 58 (FIGS. 3 and 3A) which extend between the braces 18 and 19 along the sides of the path of travel of the draw means 49. This provides for a very smooth operation of the draw means when the shaft is rotated. Guides 57 and 58 are omitted from FIG. 3B for clarity. As will be appreciated, when the shaft is rotated in one direction, depending on the direction of the threading, the draw bar 49 will be moved forwardly on the shaft toward the driving portion 42, whereby tensioning the cables 33 and elevating the posts 32. When the shaft 40 is rotated in the opposite direction, the draw means 49 will move rearwardly along the shaft portion 41, releasing the tension on the cables, and permitting the posts 32 to return to their normal collapsed condition. The weight of the top T will assist in causing the posts to collapse smoothly and uniformly as the cables 33 are permitted to move toward their respective posts 32.

In accordance with the present invention, a first sprocket means is fixedly mounted on the panel adjacent end of the shaft driving portion 42 for turning the shaft. As shown more clearly in FIGS. 3B, 8 and 9, the sprocket 59 is mounted on the forward end of shaft portion 42 adjacent panel 10, the sprocket being keyed or otherwise locked to the shaft for rotation therewith. There is also provided a second sprocket wheel 60 of larger size than sprocket 59 which is mounted adjacent panel 10 on a stub shaft 61. In the illustration given, shaft 61 is rotatably mounted in a suitable bearing supported by the vertically extending brace 62, as shown more clearly in FIGS. 3B and 8. The outer end of stub shaft 61 preferably extends through panel 10, or is otherwise accessible from the outside of the panel, and is adapted to receive a manual operating crank for turning the stub shaft, such as the crank 44, as shown in FIG. 8. The outer end of stub shaft 60 may be formed with a square cross section, or otherwise adapted to cooperate with the socket connection of the crank, in the same manner as the projecting end portion 43 of the screw shaft. As shown, the same crank 44 can be used for turning either the stub shaft 61 or the driving shaft portion 42, the crank being insertable on or removable from the projecting end portions of the shaft. For storage, the crank can be completely removed and kept inside of the trailer body. On reaching the campsite, the crank can be used for direct operation of the screw shaft, or indirect operation through the stub shaft.

Suitable chain means 63 is provided for drivingly connecting sprocket 60 to sprocket 59. Preferably, chain engaging portions of the sprockets 59 and 60 are of appreciably different sizes, for example, sprocket 60 can be formed with a substantially larger diameter than sprocket 59. To provide the desired speed variation in the raising and lowering of the top, sprocket 60 can have a diameter of from 2 to 4 times the diameter of sprocket 59. By way of specific example, sprocket 60 can have a diameter approximately 2.5 times the diameter of sprocket 59. In this embodiment, and with the construction illustrated in the drawings, it would be possible to completely elevate the top with approximately 30 turns of the sprocket 60 with the crank applied to the stub shaft 61. In a typical embodiment, this would require about 12 lbs. of force applied to the crank 44. For a slower, lower torque operation, the crank could be applied to the shaft end 43 for direct drive of the screw shaft. Correspondingly, approximately 80 turns of the crank would be required for full elevation or full lowering of the top. In elevating the top, however, only about 5 lbs. of force would need to be applied to the crank. The direct application of the crank to the screw shaft is therefore adapted for operation by women and children, while the faster, higher torque operation by a man can be through the stub shaft 54. In either operation, the operator is exposed to no hazard, the only projecting portions of the operating mechanism being the shaft ends to which the crank is applied.

As indicated in FIG. 8 and shown more clearly in FIG. 9, the projecting end of shaft portion 42 can be provided with a cooperating manual latch 64, which is effective to restrain rotation of the screw shaft when the top is in its raised or partially raised position. For this purpose, the projecting end of shaft portion 42 can be provided with a laterally-extending pin 65, which can be engaged by the hook end 66 of the latch 64, the other end of the latch being pivotally mounted on the panel 10 at 67. With the construction shown, the shaft portion 42 would be rotated in a clockwise direction, as viewed from the outer end, for elevation of the top, while being rotated in a counterclockwise direction for lowering of the top. The engagement between hook end 66 and pin 65 would therefore tend to restrain the rotation of the shaft portion 42 in the direction for lowering of the top. It will be understood that a latch similar to latch means 57 can be provided for cooperating with either or both of the projecting shaft ends. For example, similar latch means can be mounted for cooperation with the projecting end of stub shaft 61, while accomplishing the same result of restraining the rotation of the screw shaft in the direction for lowering the top.

Although the gear reduction means has been described as a chain and sprocket mechanism, equivalent gear reduction mechanisms may be employed. For example, the chain may be eliminated and the sprockets of different size may mesh directly with each other.

If the force necessary to turn the shaft 40 when the crank 44 is applied directly to the shaft end 43 is low enough to permit easy operation by a woman, then the stub shaft 61 can be made the high speed shaft by making the sprocket 60 smaller than the sprocket 59.

While in the foregoing specification this invention has been described in relation to a preferred embodiment thereof, and certain details have been set forth for the purpose of illustration, it will be apparent that the invention is susceptible to additional embodiments and that certain of the details described herein can be varied considerably without departing from the basic principles of the invention.

I claim:

1. In a camping trailer having a perimetric body case providing sidewall panels extending between the corners thereof, frame means supporting said body case adjacent its underside, wheel-equipped carriage means for the underside of said frame means, cable-operated telescopic post means mounted on said frame and extending upwardly adjacent the corners of said body case, said post means providing a plurality of extendible and retractable telescoping sections for selectively increasing and decreasing the overall height thereof from the top of the upper post sections to the bottom of the lower post sections, said post means also having cable and pulley operating means including a main operating cable for each post means extending inwardly from said lower post sections, and top cover means mounted on said upper post sections for raising and lowering movement therewith from a lower position substantially covering said body to a raised position at a spaced elevation thereabove, wherein the improvement comprises in combination with the aforesaid elements an operating mechanism characterized by:
   (a) screw shaft means rotatably mounted on said frame means,
      said shaft including a threaded driven portion extending beneath said body case and a driving portion extending to a position adjacent one of said side panels;
   (b) draw means riding on said driven shaft portion providing a threaded opening for cooperation with said shaft threads to move said draw means therealong as said shaft is rotated,
      said main operating cables being attached to said draw means by means effective for drawing said cables inwardly from said post means when said shaft is rotated in one direction and releasing them on opposite shaft rotation;
   (c) first sprocket means fixedly mounted on the panel-adjacent end of said shaft driving portion for turning said shaft;
   (d) second sprocket means operably associated with said first sprocket means and including a stub shaft mounted for rotation adjacent said one panel,
      said stub shaft having an outer end portion accessible from outside said panel and adapted to receive a manual operating crank for turning said stub shaft,
      said first and second sprocket means being sized relative to each other so that said shaft driving portion and said stub shaft will rotate at different speeds.

2. The combination of claim 1 wherein the end of said shaft means driving portion adjacent said one panel is accessible from outside said panel and is adapted to receive a manual operating crank for directly turning said shaft, whereby said operating mechanism can be operated selectively at different speeds by directly turning said shaft driving portion with said crank or by turning said stub shaft with said crank for indirectly turning said shaft driving portion.

3. The combination of claim 2 wherein detachable crank means is provided for selective alternate attachment to the outer ends of said shaft driving portion and said stub shaft.

4. The combination of claim 2 wherein manual latch means is provided for cooperation with at least one of the exteriorly accessible ends of said stub shaft and said shaft driving portion, said latch being effective to restrain rotation of said screw shaft means when said top is in its raised position.

5. The combination of claim 1 including a chain drivingly connecting said first and second sprocket means, the chain engaging portion of said first sprocket means being of substantially lesser diameter than that of said second sprocket means so that said shaft driving portion will rotate more rapidly than said stub shaft.

6. The combination of claim 5 wherein the diameter ratios of said chain engaging sprocket portions is such that the diameter of said second sprocket portion is at least twice the diameter of said first sprocket portion.

7. In a camping trailer having a perimetric body case providing sidewall panels extending between the corners thereof, frame means supporting said body case adjacent its underside, wheel-equipped carriage means for the underside of said frame means, cable-operated telescopic post means mounted on said frame and extending upwardly adjacent the corners of said body case, said post means providing a plurality of extendible and retractable telescoping sections for selectively increasing and decreasing the overall height thereof from the top of the upper post sections to the bottom of the lower post sections, said post means also having cable and pulley operating means including a main operating cable for each post means extending inwardly from said lower post sections, and top cover means mounted on said upper post sections for raising and lowering movement therewith from a lower position substantially covering said body to a raised position at a spaced elevation thereabove, wherein the improvement comprises in combination with the aforesaid elements an operating mechanism characterized by:
   (a) screw shaft means rotatably mounted on said frame means;
      said shaft including a threaded driven portion extending beneath said body case and a driving portion extending to a position adjacent one of said side panels;
   (b) draw means riding on said driven shaft portion providing a threaded opening for cooperation with said shaft threads to move said draw means therealong as said shaft is rotated,
      said main operating cables being attached to said draw means by means effective for drawing said cables inwardly from said post means when said shaft is rotated in one direction and releasing them on opposite shaft rotation;
   (c) first sprocket means fixedly mounted on the panel-adjacent end of said shaft driving portion for turning said shaft;
   (d) second sprocket means including a stub shaft mounted for rotation adjacent said one panel,
      said stub shaft having an outer end portion accessible from outside said panel and adapted to receive a manual operating crank for turning said stub shaft; and
   (e) chain means drivingly connecting said first and second sprocket means,
      the chain engaging portion of said first sprocket means being of substantally lesser diameter than that of said second sprocket means so that said shaft driving portion will rotate more rapidly than said stub shaft.

8. The combination of claim 7 wherein the end of said shaft means driving portion adjacent said one panel is accessible from outside said panel and is adapted to receive a manual operating crank for directly turning said shaft, whereby said operating mechanism can be operated selectively by directly turning said shaft driving portion for low speed low torque actuation or indirectly by turning said stub shaft for high speed high torque actuation.

9. The combination of claim 8 wherein the diameter ratios of said chain engaging sprocket portions is such that the diameter of said second sprocket portion is at least twice the diameter of said first sprocket portion.

10. The combination of claim 8 wherein manual latch means is provided for cooperation with at least one of the exteriorly accessible ends of said stub shaft and said shaft driving portion, said latch being effective to restrain rotation of said screw shaft means when said top is in its raised position.

11. The combination of claim 1 wherein said first sprocket means is positioned generally equidistant from the pair of corners of said body case associated with said panel, said second sprocket means being positioned upwardly and toward one of said pair of corners with respect to said first sprocket means.

12. The combination of claim 11 wherein said frame means includes a tongue extending from said body case beyond said panel, said second sprocket means being positioned generally above the point at which the tongue extends from said panel.

13. The combination of claim 7 wherein said first sprocket means is postioned generally equidistant from the pair of corners of said body case associated with said panel, said second sprocket means being positioned upwardly and toward one of said pair of corners with respect to said first sprocket means.

14. The combination of claim 13 wherein said frame means includes a tongue extending from said body case beyond said panel, said second sprocket means being positioned generally above the point at which the tongue extends from said panel.

References Cited

UNITED STATES PATENTS

| | | | |
|---|---|---|---|
| 3,314,715 | 4/1967 | Bontrager | 296—23 |
| 3,397,909 | 8/1968 | Gossman | 296—27 |
| 1,304,450 | 5/1919 | Bublitz | 74—217 |

PHILIP GOODMAN, Primary Examiner

U.S. Cl. X.R.

296—27